(12) United States Patent
Rylyakov et al.

(10) Patent No.: US 9,048,954 B2
(45) Date of Patent: Jun. 2, 2015

(54) OPTICAL INTERCONNECT USING OPTICAL TRANSMITTER PRE-DISTORTION

(75) Inventors: Alexander V. Rylyakov, Mount Kisco, NY (US); Clint L. Schow, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 544 days.

(21) Appl. No.: 13/039,003

(22) Filed: Mar. 2, 2011

(65) Prior Publication Data

US 2012/0224849 A1 Sep. 6, 2012

(51) Int. Cl.
*H04B 10/2507* (2013.01)
*H04B 10/2513* (2013.01)

(52) U.S. Cl.
CPC ...... *H04B 10/2507* (2013.01); *H04B 10/25073* (2013.01); *H04B 10/25137* (2013.01); *H04B 2210/254* (2013.01)

(58) Field of Classification Search
CPC ............. H04B 10/775; H04B 10/7951; H04B 10/7953; H04B 10/7955; H04B 10/2507; H04B 10/25073; H04B 10/25137
USPC .................................. 398/147–150, 158–161
See application file for complete search history.

(56) References Cited

U.S. PATENT DOCUMENTS

| | | | |
|---|---|---|---|
| 5,361,156 A | 11/1994 | Pidgeon | |
| 6,559,994 B1 | 5/2003 | Chen et al. | |
| 7,155,132 B2 | 12/2006 | Chiappetta | |
| 7,254,342 B2 | 8/2007 | Odate et al. | |
| 7,382,984 B2 | 6/2008 | McNicol et al. | |
| 7,426,350 B1 * | 9/2008 | Sun et al. | 398/193 |
| 7,634,198 B2 | 12/2009 | Peral | |
| 7,756,421 B2 | 7/2010 | Roberts et al. | |
| 7,805,082 B1 | 9/2010 | Whiteaway | |
| 8,086,110 B2 * | 12/2011 | Watts et al. | 398/194 |
| 2007/0222654 A1 * | 9/2007 | Vrazel et al. | 341/144 |
| 2009/0047025 A1 * | 2/2009 | Hong et al. | 398/135 |
| 2009/0103927 A1 * | 4/2009 | Cunningham et al. | 398/139 |

OTHER PUBLICATIONS

Berger, C. et al., "High-Density Optical Interconnects within Large-Scale Systems" IBM Research, Zurich Research Laboratory, Switzerland (2007-2008).
Ahadian, J. et al., "Analog Modulation Characteristics of Multimode Fiber Links Based on Commercial VCSELs" Ultra Communications: Characteristics of VCSEL RF Photonic Links (Aug. 11, 2009).
Waegemans, R. "Digital Electronic Predisposition for Optical Communications" Department of Electronic and Electrical Engineering, University College London (Oct. 2009).
Winters, J.H. et al., "Reducing the Effects of Transmission Impairments in Digital Fiber Optic Systems" IEEE Communications Magazine (Jun. 1993) pp. 68-76.

* cited by examiner

*Primary Examiner* — Dzung Tran
(74) *Attorney, Agent, or Firm* — Scully, Scott, Murphy & Presser, P.C.; Anne V. Dougherty, Esq.

(57) ABSTRACT

In one embodiment, the invention provides an optical interconnect comprising a transmitter for generating and transmitting an optical signal, a receiver for receiving the optical signal from the transmitter and for converting the received optical signal to an electrical signal, and a pre-transmitter distort circuit for applying a pre-transmitter distort signal to the transmitter to adjust the shape of the optical signal generated by the transmitter. Distortions are introduced into the optical signal when the optical signal is generated, transmitted to the receiver, and converted to the electrical signal. As a result of the signal applied to the transmitter by the pre-transmitter distort circuit, the optical signal generated by the transmitter has distortions to compensate for the distortions introduced into the optical signal, wherein the electrical signal, into which the optical signal is converted, has a desired shape.

25 Claims, 5 Drawing Sheets

OPTICAL INTERCONNECT USING OPTICAL TRANSMITTER PRE-DISTORTION

STATEMENT OF GOVERNMENT INTEREST

This invention was made with Government support under Contract No.: MDA972-03-3-0004 awarded by Defense Advanced Research Projects Agency. The Government has certain rights in this invention.

BACKGROUND OF THE INVENTION

This invention generally relates to fiber and waveguide optics, and more specifically, to optical interconnects in fiber optic transmissions.

Fiber optics and optical interconnects are used in a wide variety of applications. The use of optical fibers as a medium for transmission of digital data (including voice data) is becoming increasingly more common due to the high reliability and large bandwidth available with optical transmission systems. In addition, optical interconnects provide for a significant increase to the available bandwidth of board-level interconnects.

For example, short-reach interconnects over multi-mode optical fiber (MMF), on the order of 100 m, are widely used in computer systems, data centers, and campus networks. For these data links, the optical channel contributes relatively little signal degradation for 10-40 G data rates. In addition, generations of fiber with optimized modal bandwidth continue to be developed that minimize this primary source of signal degradation. The biggest challenge for short-reach interconnects is to produce active components, namely optical transmitters and receivers, that provide sufficient bandwidth to operate at high data rates (>20 Gb/s) while maintaining low power consumption to maximize the power efficiency, commonly expressed in mW/Gb/s or pJ/bit: the energy required to transmit a bit of information.

The typical approach to implementing an optical link is to separate the transmitter and receiver and design them separately. The transmitter (TX) is optimized to make its digital optical output as ideal as possible, while the receiver (RX) is designed to receive the transmitted optical signal and convert it to an electrical signal with high sensitivity (to operate with as little optical power as possible at a given bit-rate), and with minimum added jitter. Both TX and RX are designed to meet their specifications while consuming a minimum amount of power.

The most straightforward method for building optical TXs and RXs is to utilize high-speed analog drivers and receiver amplifiers that have sufficient bandwidth to faithfully convert the electrical signal to an optical signal and back again with minimal distortion. However, as data rates have increased beyond 10 Gb/s, it is difficult to realize the multimode optical devices (lasers and detectors) and amplifier circuits with sufficient raw bandwidth with acceptable power consumption. To achieve the highest data rates, the lasers must be operated at high current densities and the circuits typically consume high amounts of electrical power to deliver the required speed performance.

BRIEF SUMMARY

Embodiments of the invention provide a method and system for compensating for distortions introduced into an optical signal, in the operation of an optical interconnect, as the optical signal is generated, transmitted to a receiver, and converted into an electrical signal. Generally, embodiments of the invention pre-distort the optical output of an optical transmitter such that when the optical signal is received by a receiver and converted into an electrical signal, the overall link performance is improved. The link improvement is quantified through multiple parameters: data rate capability, power efficiency, sensitivity or link margin, and timing margin improvement or reduced jitter.

In one embodiment, the invention provides an optical interconnect comprising a transmitter for generating and transmitting an optical signal, a receiver for receiving the optical signal from the transmitter and for converting the received optical signal to an electrical signal, and a pre-transmitter distort circuit connected to the transmitter for applying a pre-distort signal to the transmitter to adjust the shape of the optical signal generated by the transmitter. In the operation of this interconnect, distortions are introduced into the optical signal when the optical signal is generated, transmitted to the receiver, and converted to the electrical signal. As a result of the pre-distort signal applied to the transmitter from the pre-transmitter distort circuit, the optical signal generated by the transmitter has particular distortions that compensate for the above-mentioned distortions introduced into the optical signal as that signal is generated, transmitted and converted. As a result of this the electrical signal, into which the optical signal is converted, has a desired shape.

In an embodiment, the pre-transmitted distort circuit includes an equalizer circuit located in parallel with the main driver stage for the transmitter. In one embodiment, the equalizer circuit includes a time delay control and a signal strength control. The time delay control is used for controlling a time delay of a feed-forward component of the pre-distort signal applied to the transmitter, and the signal strength control is used for controlling the strength of said feed forward component of the pre-distort signal applied to the transmitter.

In one embodiment, the pre-transmitter distort circuit includes a main circuit portion and a feed forward circuit portion, and the time delay control and the strength control are located in series in said feed forward circuit portion. In an embodiment, the time delay control is continuously variable over a given time range, and the strength control is continuously variable over a given strength range.

In an embodiment, the equalizer circuit includes a main buffer on the main circuit portion of the equalizer circuit to buffer a main portion of the signal applied to the transmitter, and a tap buffer on the feed forward circuit portion of the equalizer circuit to buffer said feed forward component of the signal applied to the transmitter.

Embodiments of the invention apply equalization to overcome the limited performance of the optical components and the circuits that comprise the optical link, not to overcome signal impairments due to the fiber transmission. Equalization has been previously demonstrated to compensate for signal distortion arising from fiber bandwidth limitations and is widely used in long-distance optical communication systems in the form of fiber dispersion compensators. The approach in the current invention is very different. The output current or voltage of the transmitter circuit is pre-emphasized, possibly to the point of visible distortion.

The optical device connected to the transmitter circuit, in one embodiment a Vertical Cavity Surface Emitting Laser (VCSEL), converts the pre-emphasized/distorted output of the circuit into a pre-emphasized/distorted optical signal, but when the transmitter optical output is presented to a bandwidth-limited receiver, the data recovered by the receiver is dramatically improved. The present invention uses transmitter equalization or pre-distortion to optimize the total link performance, that is the electrical output of the receiver and not to improve the signal quality at an intermediate point such as the transmitter output or receiver input.

DETAILED DESCRIPTION

Figure 1:
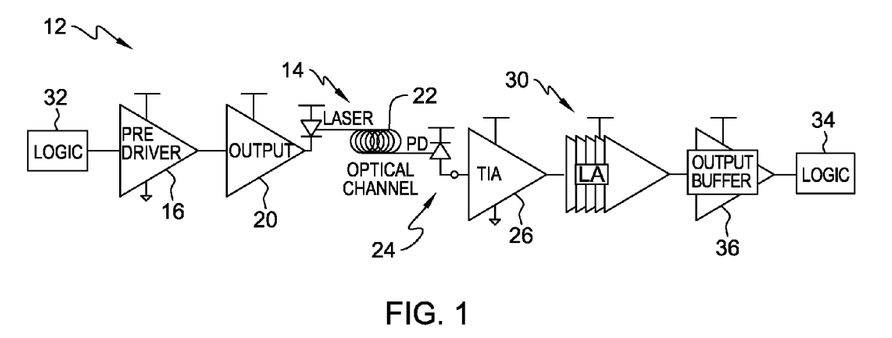
FIG. 1 is a block diagram of a typical optical data link.

A block diagram of a typical optical data link is shown in FIG. 1. A laser diode driver 12 (LDD) converts an incoming data stream into a modulation current that is used to directly modulate the optical output of a laser 14. The laser driver is typically divided into a pre-driver stage 16 followed by an output stage 20 that directly interfaces with the laser. The modulated optical output of the laser is routed through a channel 22, typically optical fiber or optical waveguides, and coupled into an optical receiver 24. The optical receiver 24, in the embodiment shown in FIG. 1, is a photodiode that converts the incident optical signal into a small electrical current. The photodiode is connected to a transimpedance amplifier (TIA) 26 that converts the photodiode current into a voltage with some amount of gain. The TIA is followed by one or more amplifier stages 30 that provide additional gain to increase the output amplitude of the receiver to a useful level (typically 0.1-1V).

FIG. 1 also shows logic devices 32 and 34 and buffer 36. Logic device 32 applies digital data and logic control signals to the laser drive 12, and logic device 34 receives the digital signal from amplifier 30 and converts that signal into a digital format. Buffer 36 is located between amplifier 30 and logic device 34 to drive the electrical link between the amplifier and the logic device.

Figure 2:
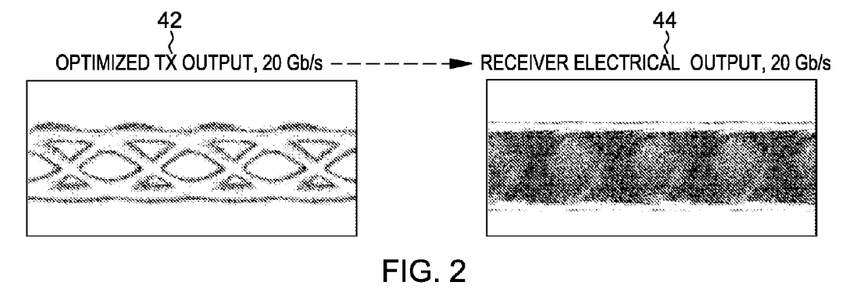
FIG. 2 shows the optical output of a transmitter and the electrical output of a receiver in a link operated in a convention manner.

Typically the optical link is designed such that the transmitter optical output is as clean as possible, meaning that the logical "1"/"0" transitions are as fast as possible, that the "1" and "0" levels are uniform with minimal over/undershoot, and that the jitter is as low as possible. All of these goals are captured in viewing an eye diagram that overlays many digital transitions over each other in time. An example of an optimized transmitter eye diagram at 20 Gb/s is shown in FIG. 2 at 42. The problem is that when the optimized TX signal is received, the eye diagram 44 of the receiver's electrical output is completely closed: none of the bits of information are successfully transferred through the optical link.

Figure 3:
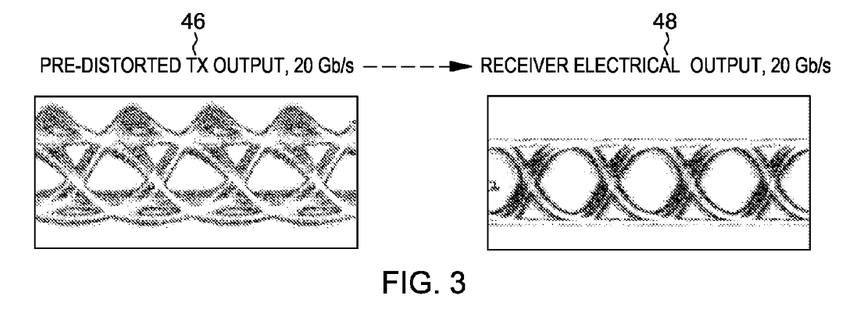
FIG. 3 shows the optical output of a transmitter and the electrical output of a receiver utilizing transmitter pre-distortion.

In accordance with an embodiment of the invention, the optical output of the optical transmitter is purposefully pre-distorted with significant over- and under-shoot and jitter. However, when the optical signal is presented to the optical receiver with limited bandwidth, the quality of the data recovery performed by the receiver is dramatically improved. This effect is shown in FIG. 3 in which the pre-distorted TX output 46 shows significant degradation in terms of over- and under-shoot and jitter. However, when the pre-distorted optical signal is received, the receiver produces an open eye-diagram 48, indicating that the bits of information are being successfully transferred through the optical link.

This pre-distortion technique has been demonstrated to be effective in enabling optical links to work at significantly higher data rates, as illustrated in the comparison between the receiver outputs in FIGS. 2 and 3. In addition, by enabling operation at higher data rates, the power efficiency of the link is improved in terms of pJ/bit since more bits can be transmitted for a given amount of power consumed. The link margin is also improved by a significant amount: at high data rates the pre-distortion technique can improve the receiver sensitivity (the minimum power required to operate at a given bit error ration) by >6 dB (4×). In addition, the power consumption required to operate the pre-distortion circuit is very low, on the order of 5% of the total circuit power consumption. Therefore all of the benefits of increased data rate, power efficiency, and link margin come at the cost of a very minimal increase in raw power consumption (the per-bit power consumption is decreased).

Figure 4:
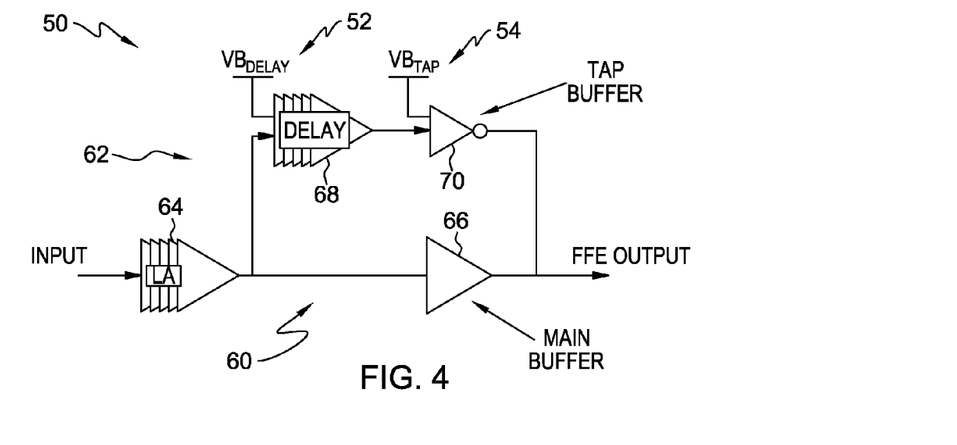
FIG. 4 is a schematic diagram of a feed forward equalizer circuit used in an embodiment of the invention to generate a pre-distorted transmitter output.
Figure 5:
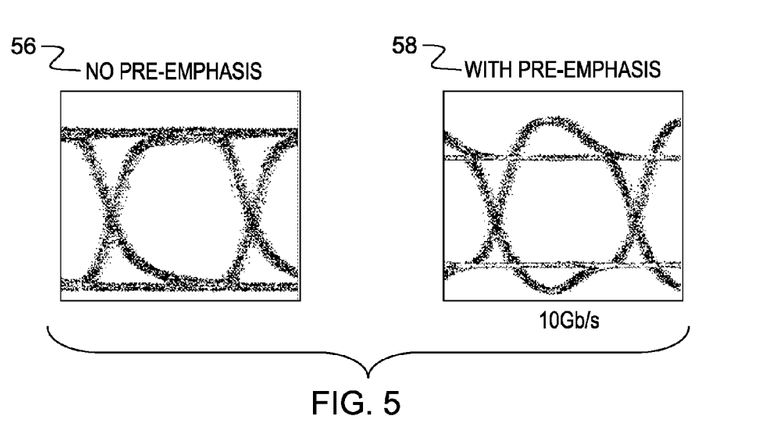
FIG. 5 shows eye diagrams that illustrate results of using the equalizer circuit of FIG. 4 without and with pre-emphasis of the transmitter output.

A variety of circuits may be used to implement the transmitter pre-distortion described above. For example, as shown in FIG. 4, embodiments of the invention may use a feed-forward equalizer (FFE) 50 preceding a final driver stage directly connected to a VCSEL. The FFE amplifier has two controls, VBDELAY 52 and VBTAP 54 that control the time-delay and strength of the fed-forward portion of the signal that is subtracted from the main signal. These two signal portions make the shape and amount of the pre-distortion continuously variable, from no distortion to maximum distortion. FIG. 5 shows, as example, an eye diagram 56 of a transmitter output with no distortion, and an eye diagram 58 of a transmitter output with heavily pre-emphasized transmitter output.

Circuit 50 includes a main circuit portion 60 and a tap or feed forward portion 62. The main signal portion through circuit 50 parses from the circuit input, through linear amplifiers 64, through main buffer 66, and then to the circuit output. A portion of the main signal is tapped off the circuit portion 60 and is conducted through feed forward portion 62. Circuit portion 62 includes time delay device 68, and buffer 70. Time delay control 52 is applied to time delay device 68, and strength control 54 is applied to buffer 70.

Figure 6:
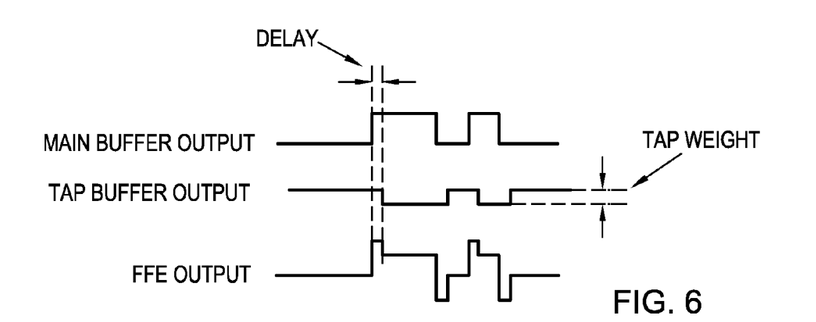
FIG. 6 shows examples of the main buffer output and the tap buffer output of the circuit of FIG. 4, and the output of the circuit itself.

FIG. 6 illustrates the currents outputs of the main buffer 66, tap buffer 70, and of the equalizer circuit 50. As can be seen, the main buffer 66 and the tap buffer 70 introduce different time delays, and the strength of the tap buffer output adjusted by strength control 54. The main buffer output and the tap buffer output are combined to produce the FFE circuit output.

Figure 7:
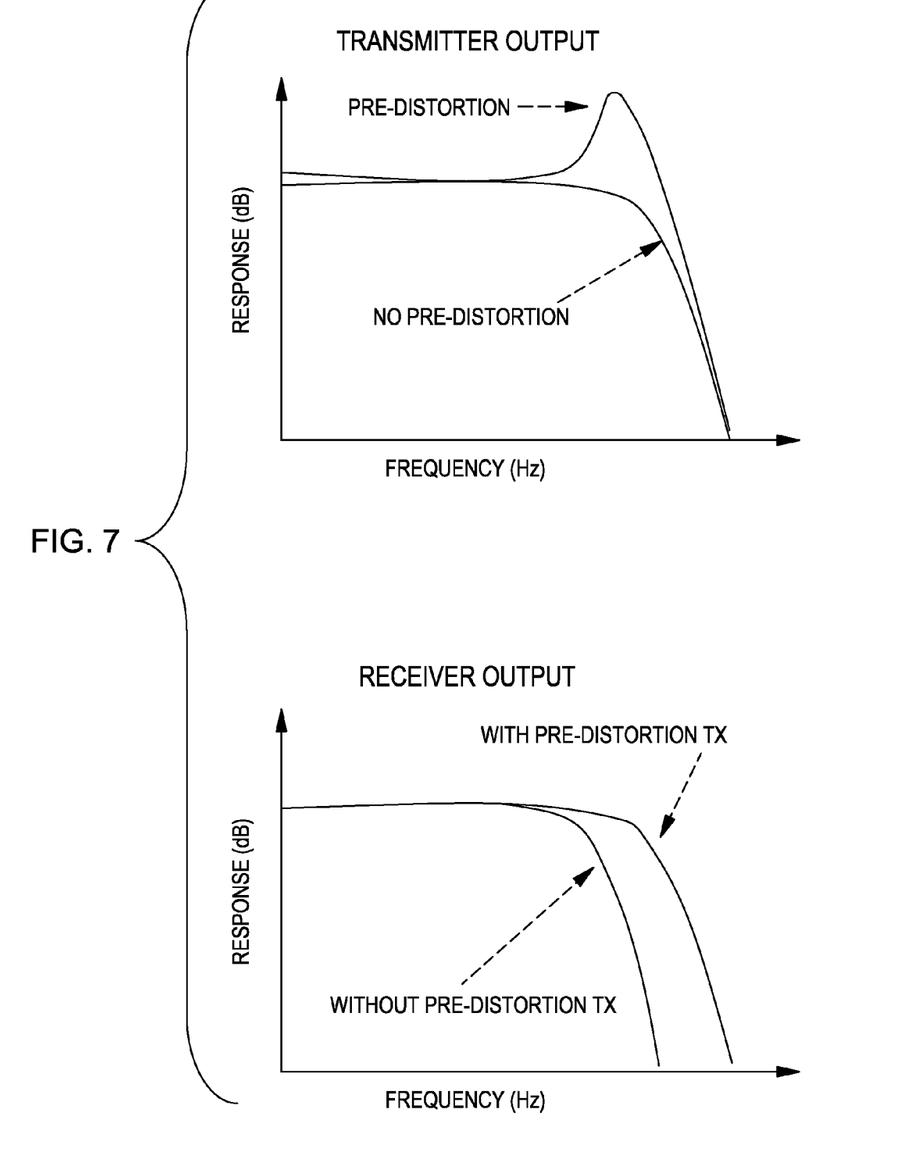
FIG. 7 illustrates a transmitter frequency response output and a receiver frequency response output of an optical interconnect using an embodiment of the invention.

The pre-distortion technique is particularly effective for VCSELs and receivers with relatively low bandwidth. The pre-emphasis (pre-distortion) shown in FIG. 4 emphasizes the high-frequency components of the signal compared to the lower frequency components. The VCSEL rise/fall times are improved and the receiver output is dramatically affected since as the signal traverses the receiver, which acts as a low-pass filter, the higher frequencies in the pre-distorted signal are attenuated. This results in a flat frequency response with a greater bandwidth compared to the case where the input signal is not pre-distorted. The effect of pre-distortion is illustrated through the example frequency response shown in FIG. 7.

Figure 8:
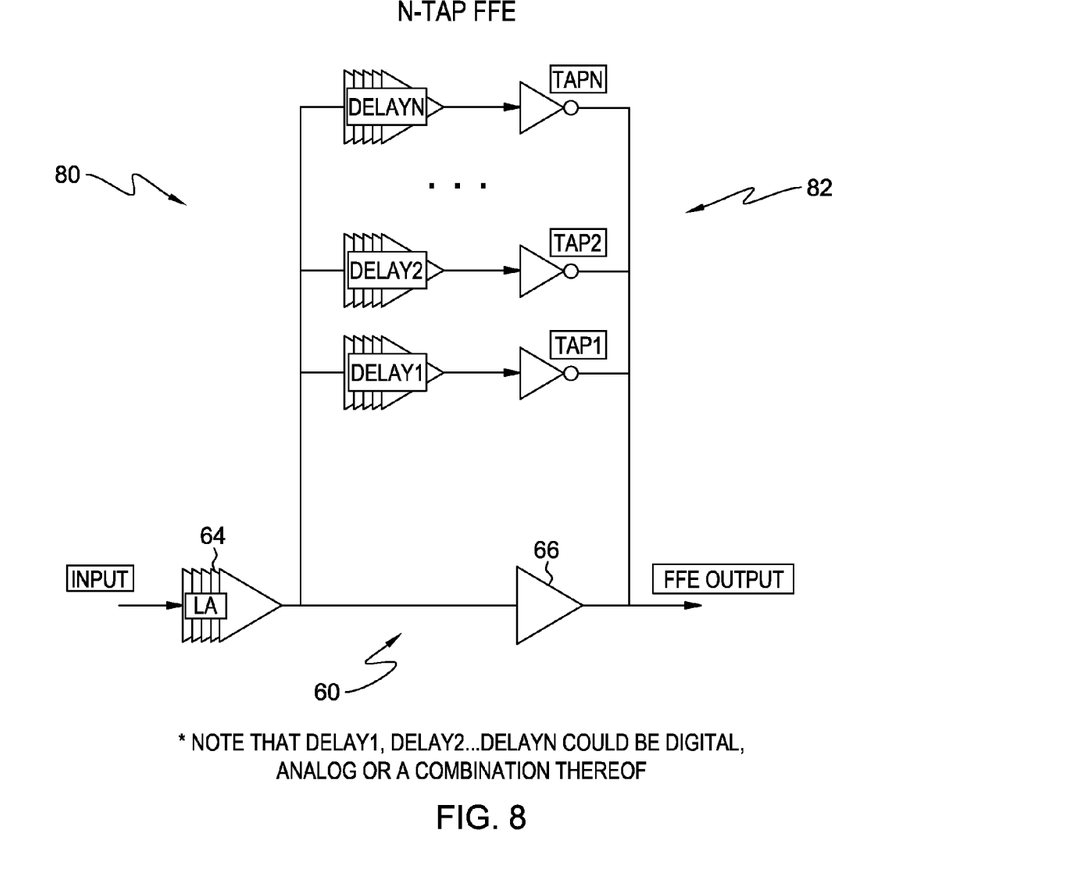
FIG. 8 shows an N-tap feed forward equalizer that may be used in an embodiment of the invention.

The present invention may be used with a feed-forward equalizer having plural or multiple taps, and provides a digital, analog, or a mixed digital and analog implementation of the pre-transmitter distort signal. FIG. 8 shows, for example, a feed forward equalizer 80 having N taps 82. Each of these taps is connected in parallel with the transmitter and the driver stage for the transmitter.

Figure 9:
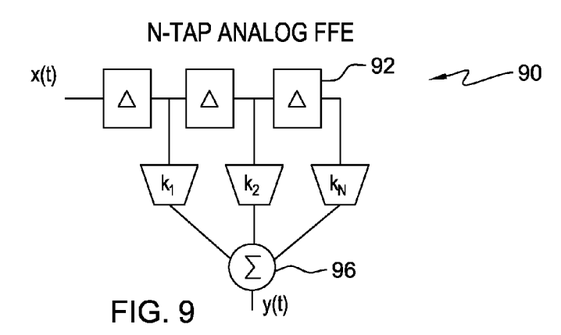
FIG. 9 depicts an N-tap analog feed forward equalizer that may be used in an embodiment of the invention.

FIG. 9 shows an N-tap analog feed-forward equalizer 90 having input x(t), a series of analog devices 92, a summer 96, and an output y(t). With reference to FIGS. 8 and 9, input x(t) would be received from the output of linear amplifier 64, and output y(t) would be applied after buffer 66.

Figure 10:
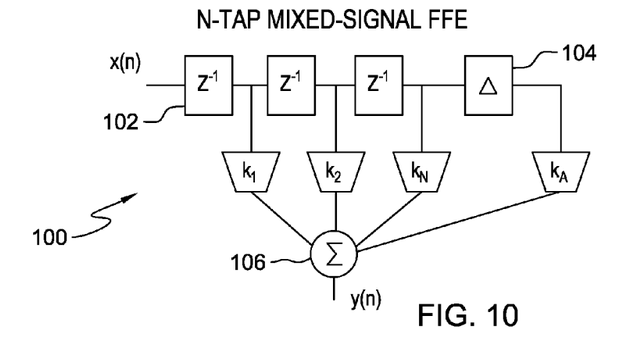
FIG. 10 illustrates an N-tap mixed digital and analog feed forward equalizer that may be used in an embodiment of the invention.

FIG. 10 shows an N-tap mixed signal feed-forward equalizer 100 having input x(n), a series of digital devices 102, an analog device 104, a summer 108, and an output y(n). With reference to FIGS. 8 and 10, input x(n) would be received from the output of linear amplifier 64, and output y(n) would be applied after buffer 66.

Figure 11:
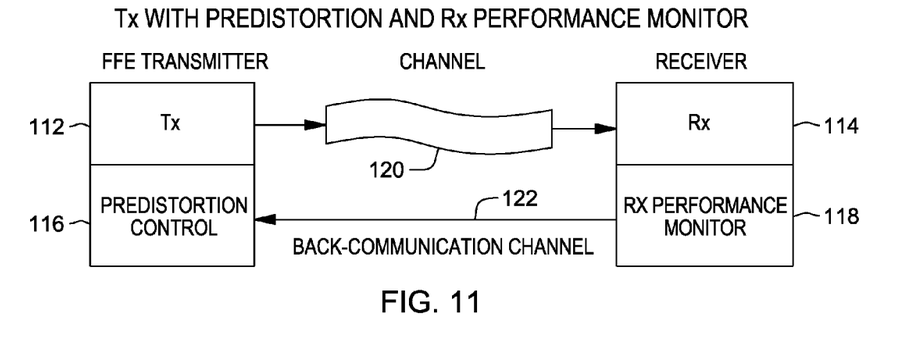
FIG. 11 shows an embodiment of the invention including a performance monitor.

In one aspect, the invention provides a method of looking at the final received data in order to adjust the pre-distortion to an optimum point. FIG. 11 illustrates an embodiment of this aspect of the invention. In particular, FIG. 11 shows a transmitter 112, receiver 114, pre-distortion control 116, receiver performance monitor 118, optical signal channel 120, and back-communication channel 122.

The pre-distortion may be adjusted by monitoring the jitter or the bit-error rate of the receiver output. This adjustment could be either an initial calibration step of a monitoring circuit on the receiver side with a back-communication channel 122 to the transmitter. For a given link with a set bandwidth, the calibration setting for one part may be applicable to a large set of similar parts using the same components.

The fact that embodiments of the invention show the greatest improvement when applied to optical links with low-bandwidth VCSELs and receivers makes it extremely valuable. VCSEL speed and reliability are often inversely related: the bandwidth of a VCSEL improves as its bias current increases, but the lifetime is concurrently reduced. For receivers, the bandwidth and sensitivity are always linked and inversely proportional. Therefore, a receiver can be purposefully constructed with a bandwidth lower than that required to operate at a given data rate, but with higher sensitivity at lower data rates. This would mean that the receiver would not operate at the target date rate without transmitter pre-distortion, but the performance of the receiver, and therefore the complete optical link can be restored at the target data rate through transmitter pre-distortion.

Another example of where a lower bandwidth receiver may be very useful is to reduce packaging cost. The primary factor that determines the bandwidth of the front-end of an optical receiver is the capacitance of the photodiode. Therefore, as data rates increase, photodiodes always get smaller to contribute a smaller capacitance. But smaller photodiodes are more expensive to package since they are more sensitive to mechanical misalignment and so require very precise and costly assembly tools. Embodiments of the invention can help to alleviate this situation: a relatively large photodiode can be used that reduces the bandwidth of the receiver but the receiver (and link) can be successfully operated at a data rate beyond that expected based on the receiver bandwidth through the application of transmitter pre-distortion.

Embodiments of the invention significantly improve the sensitivity, power efficiency, and jitter of optical links at data rates higher than can be achieved without using embodiments of the invention. Although one implementation is to improve the speed and power efficiency of VCSEL based links, embodiments of the invention are widely applicable to a variety of optical interconnects utilizing different transmitter technologies, such as directly-modulated distributed feedback (DFB) lasers, electro-absorption (EA) or Mach-Zehnder (MZ) modulators and for Si-Photonic integrated modulators (MZ, ring-based, or EA).

Embodiments of this invention have a wide range of applications in all optical communication systems. Embodiments of the invention are particularly suited for applications in multimode optical interconnects where the VCSEL, photodiode, and circuits all have relatively low bandwidths due to their low-cost. Embodiments of the invention are also well suited for highly integrated silicon photonics designs, where power-efficient modulators and circuits may also be bandwidth limited. The demonstrated improvements in speed capability, power-efficiency, link margin and timing jitter make embodiments of this invention well suited to a wide variety of optical interconnects.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. An optical interconnect comprising:
   a transmitter for generating and transmitting an optical signal;
   a receiver for receiving the optical signal from the transmitter and for converting the received optical signal from the transmitter to an electrical signal;
   a pre-transmitter distort circuit connected to the transmitter for applying a pre-distort signal to the transmitter, based on the electrical signal into which the optical signal received from the transmitter is converted by the receiver, to adjust the shape of the optical signal generated by the transmitter, the pre-transmitter distort circuit including an equalizer circuit including
   a main circuit portion for conducting a main component of the pre-distort signal, and
   a feed forward circuit portion for subtracting a time delayed variable strength feed forward component of the pre-distort signal from said main component of the pre-distort signal to obtain said pre-distort signal;
   wherein distortions are introduced into the optical signal when the optical signal is generated by the transmitter, transmitted to the receiver, and converted by the receiver to the electrical signal; and
   as a result of the pre-distort signal applied to the transmitter from the pre-transmitter distort circuit, the optical signal generated by the transmitter has particular distortions to compensate for said distortions introduced into the optical signal generated by the transmitter, wherein the electrical signal, into which the optical signal is converted by the receiver, has a desired shape.

2. The optical interconnect according to claim 1, wherein the equalizer circuit is located in parallel with the transmitter and a driver stage for the transmitter.

3. The optical interconnect according to claim 2, wherein the equalizer circuit includes a time delay control for controlling a time delay of a feed-forward component of the pre-distort signal applied to the transmitter.

4. The optical interconnect according to claim 3, wherein the equalizer circuit includes a strength control for controlling the strength of said feed forward component of the pre-distort signal applied to the transmitter.

5. The optical interconnect according to claim 4, wherein:
   the time delay control and the strength control are located in parallel with said feed forward circuit portion;
   the time delay control is continuously variable over a given time range; and
   the strength control is continuously variable over a given strength range.

6. The optical interconnect according to claim 2, wherein:
   the equalizer circuit has a plurality of taps, and each of the taps is connected in parallel with the transmitter and the drive stage for the transmitter; and
   the equalizer circuit provides a digital, analog, or a mixed digital and analog implementation of the pre-transmitter distort signal.

7. The optical interconnect according to claim 6, wherein the equalizer circuit includes a main buffer on the main circuit portion of the equalizer circuit to buffer a main portion of the signal applied to the transmitter, and a tap buffer on the feed forward circuit portion of the equalizer circuit to buffer said feed forward component of the signal applied to the transmitter.

8. The optical interconnect according to claim 7, wherein the transmitter is a vertical cavity surface emitting laser.

9. A method of operating an optical interconnect, comprising:
   generating and transmitting an optical signal from a transmitter to a receiver;
   at the receiver, converting the received optical signal from the transmitter to an electrical signal, wherein distortions are introduced into the optical signal when the optical signal is generated by the transmitter, transmitted to the receiver, and converted by the receiver to the electrical signal;
   applying a pre-transmitter distort signal to the transmitter, based on the electrical signal into which the optical signal received from the transmitter is converted by the receiver, to adjust the shape of the generated optical signal, including subtracting a time delayed variable strength feed forward component of the distort signal from a main component of the distort signal to obtain said distort signal;
   wherein the optical signal generated by the transmitter has particular distortions to compensate for said distortions introduced into the optical signal generated by the transmitter, wherein the electrical signal, into which the optical signal is converted by the receiver, has a desired shape.

10. The method according to claim 9, wherein the applying a pre-transmitter distort signal to the transmitter includes using an equalizer circuit located in parallel with the transmitter and a driver stage for the transmitter to apply said distort signal to the transmitter.

11. The method according to claim 10, wherein the equalizer circuit includes a time delay control for controlling a time delay of the feed-forward component of the pre-distort signal applied to the transmitter, and a strength control for controlling the strength of said feed forward component of the pre-distort signal applied to the transmitter.

12. The method according to claim 11, wherein the pre-transmitter distort circuit includes a main circuit portion and a feed forward circuit portion, and the time delay control and the strength control are located in parallel with said feed forward circuit portion.

13. The method according to claim 11, wherein the equalizer circuit includes a main buffer on the main circuit portion of the equalizer circuit to buffer a main portion of the signal applied to the transmitter, and a tap buffer on the feed forward circuit portion of the equalizer circuit to buffer said feed forward component of the signal applied to the transmitter.

14. A method of operating an optical interconnect, comprising:
   generating and transmitting an optical signal from a transmitter to a receiver;
   at the receiver converting the received optical signal to an electrical signal, wherein distortions are introduced into the optical signal when the optical signal is generated, transmitted to the receiver, and converted to the electrical signal;
   applying a pre-transmitter distort signal to the transmitter to adjust the shape of the generated optical signal, wherein the generated optical signal generated has particular distortions to compensate for said distortions introduced into the optical signal, wherein the electrical signal, into which the optical signal is converted, has a desired shape, including using an equalizer circuit to apply said distort signal to the transmitter; and wherein
   the equalizer circuit includes a time delay control for controlling a time delay of a feed-forward component of the distort signal applied to the transmitter, and a strength control for controlling the strength of said feed forward component of the distort signal applied to the transmitter; and
   the time delay control is continuously variable over a given time range, and the strength control is continuously variable over a given strength range.

15. An optical transmission system, comprising
   a transmitter for generating and transmitting an optical signal;
   a driver to transmit a drive signal to the transmitter to operate the transmitter;
   a receiver for receiving the optical signal from the transmitter and for converting the received optical from the transmitter to an electrical signal;
   a pre-transmitter distort circuit, connected between the driver and the transmitter, for adjusting the drive signal, based on the electrical signal into which the optical signal received from the transmitter is converted by the receiver, to adjust the shape of the optical signal generated by the transmitter, the pre-transmitter distort circuit including an equalizer circuit including
   a main circuit portion for conducting a main component of the pre-distort signal, and
   a feed forward circuit portion for subtracting a time delayed variable strength feed forward component of the pre-distort signal from said main component of the pre-distort signal to obtain said pre-distort signal;
   wherein distortions are introduced into the optical signal when the optical signal is generated by the transmitter, transmitted to the receiver, and converted by the receiver to the electrical signal; and
   as a result of said adjusting of the drive signal by the pre-transmitter distort circuit, the optical signal generated by the transmitter has particular distortions to compensate for said distortions introduced into the optical signal generated by the transmitter, wherein the electrical signal, into which the optical signal is converted by the receiver, has a given shape.

16. The optical system according to claim 15, wherein the equalizer circuit is located in parallel with the transmitter and said driver.

17. The optical system according to claim 16, wherein the equalizer circuit includes a time delay control for controlling a time delay of the feed-forward component of the signal applied to the transmitter.

18. The optical system according to claim 17, wherein the equalizer circuit includes a strength control for controlling the strength of said feed forward component of the signal applied to the transmitter.

19. The optical system according to claim 18, wherein the time delay control and the strength control are located in series in said feed forward circuit portion.

20. The optical system according to claim 19, wherein the time delay control is continuously variable over a given time range, and the strength control is continuously variable over a given strength range.

21. A method of adjusting the operation of an optical system, comprising:
    applying a drive signal from a driver to a transmitter to generate an optical signal;
    transmitting the optical signal from the transmitter to a receiver;
    at the receiver converting the received optical signal from the transmitter to an electrical signal, wherein distortions are introduced into the optical signal when the optical signal is generated by the transmitter, transmitted to the receiver, and converted by the receiver to the electrical signal;
    applying a pre-transmitter distort signal to the drive signal, based on the electrical signal into which the optical signal received from the transmitter is converted by the receiver, to adjust the shape of the generated optical signal, including subtracting a time delayed variable strength feed forward component of the distort signal from a main component of the distort signal to obtain said distort signal; and wherein the generated optical signal has particular distortions to compensate for said distortions introduced into the optical signal generated by the transmitter, wherein the electrical signal, into which the optical signal is converted by the receiver, has a compensated shape; and
    monitoring the electrical signal and adjusting the distort signal, on the basis of said monitoring, to adjust the shape of the electrical signal.

22. The method according to claim 21, wherein the electrical signal includes jitter, and the monitoring and adjusting includes monitoring said jitter.

23. The method according to claim 21, wherein the electrical signal includes a bit-error rate, and the monitoring and adjusting includes monitoring said bit-error rate.

24. The method according to claim 21, wherein the monitoring and adjusting includes:
    using a performance monitor to monitor the receiver;
    using a pre-distortion control to control the pre-distort signal;
    transmitting a signal from the performance monitor to the pre-distortion control to adjust the pre-distort signal.

25. The method according to claim 21, wherein:
    the applying a pre-transmitter distort signal to the drive signal includes using an equalizer circuit located in parallel with the transmitter and the driver to apply said distort signal to the drive signal;
    the equalizer circuit includes a time delay control for controlling a time delay of the feed-forward component of the pre-distort signal applied to the transmitter, and a strength control for controlling the strength of said feed forward component of the pre-distort signal applied to the transmitter; and
    the monitoring and adjusting includes using the equalizer circuit to adjust the distort signal.

* * * * *